United States Patent [19]

Stelzer, deceased et al.

[11] Patent Number: 5,129,045
[45] Date of Patent: Jul. 7, 1992

[54] METHOD FOR THE CONTROL OF POSITIONING SYSTEMS

[75] Inventors: Joerg H. M. Stelzer, deceased, late of Erlangne; by Willi Stelzer, heir; by Irmgard Stelzer, heir, both of Essen; Matthias Rusch, Berlin, all of Fed. Rep. of Germany

[73] Assignee: Siemens Aktiengesellschaft, Berlin & Munich, Fed. Rep. of Germany

[21] Appl. No.: 677,315

[22] Filed: Mar. 29, 1991

[30] Foreign Application Priority Data

Mar. 30, 1990 [EP] European Pat. Off. ........ 90106197.8

[51] Int. Cl.$^5$ ............................................. G05B 19/415
[52] U.S. Cl. ................................................. 395/87; 395/86
[58] Field of Search ................ 364/513, 474.28, 474.3, 364/474.31, 474.36, 167.01, 174; 318/567, 568.15, 568.19, 573; 395/86, 87

[56] References Cited

U.S. PATENT DOCUMENTS

| | | | |
|---|---|---|---|
| Re. 30,132 | 10/1979 | Irie | 318/568 |
| 4,456,961 | 6/1984 | Price et al. | 364/513 |
| 4,550,383 | 10/1985 | Sugimoto | 364/513 |
| 4,862,381 | 8/1989 | Shibata | 364/474.36 |
| 4,894,788 | 11/1990 | Stelzer | 364/513 |
| 4,914,363 | 4/1990 | Stelzer | 318/568.1 |
| 4,954,762 | 9/1990 | Miyake et al. | 318/568.19 |
| 4,967,125 | 10/1990 | Hara | 318/568.11 |

FOREIGN PATENT DOCUMENTS 0075792 4/1983 European Pat. Off.

OTHER PUBLICATIONS

Whitney, "The Mathematics of Coordinated Control of Prosthetic Arms and Manipulations", Trans. of the ASME Journal of Dynamic Systems, Measurement, and Control, 1972, pp. 1-7.
Robotsysteme, vol. 6, No. 1, Mar. 26, 1990, Berlin, DE, pp. 31-38; A. Visser and W. Kuehn: "*Offline-Korrektur von Bewegungsbahnen mit variabler Orientierung*".
Robot Motion, MIT Press, 1982: "*Planning and Execution of Straight Line Manipulator Trajectories*", Russel H. Taylor.
Paul R. B., "*Robot Manipulators: Mathematics, Programming and Control*", MIT Press, Cambridge, Mass. and London, GB, 1981.

Primary Examiner—Allen R. MacDonald
Attorney, Agent, or Firm—Kenyon & Kenyon

[57] ABSTRACT

A method for controlling a positioning system, such as an industrial robot, relates to a continuous velocity concatenation of motion sets. In the concatenation range, an auxiliary Cartesian coordinate system ($X_H$, $Y_H$, $Z_H$) is defined and the orientation (R1, R2, R3) of a robot's tool (W) is interpolated by means of roll, pitch and yaw angles relative to that auxiliary coordinate system. The latter is chosen so that the RPY angles B1, B2 and A1 have the value 0 at the concatenation points (UP1, UP2).

1 Claim, 4 Drawing Sheets

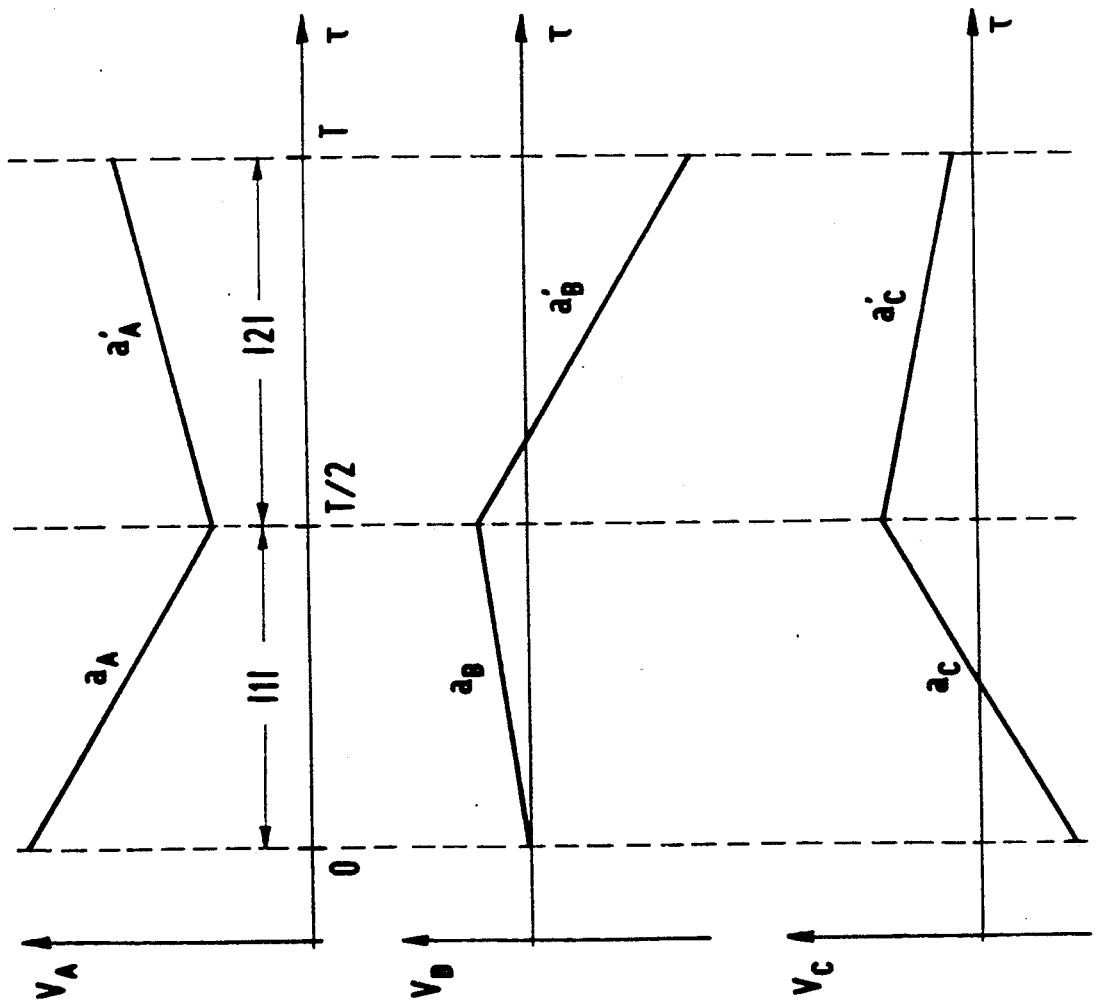

METHOD FOR THE CONTROL OF POSITIONING SYSTEMS

BACKGROUND OF THE INVENTION

The invention relates generally to control systems, and more particularly to a control system for controlling a positioning system. Modern control systems that control positioning systems make it possible to guide a body, with respect to both position and orientation, along defined trajectories in a reference system. Such positioning systems include industrial robots and machine tools, for example, which usually have several movable components.

A trajectory in space that is to be traversed is interpolated by a multitude of individual motion sets or trajectory segments. As a rule, the orientation trajectories specified cannot be continuously differentiated in the programmed intermediate points. This means that the orientation velocity of the body to be positioned is usually different at the end of the first motion set from the orientation velocity at the start of the immediately following second motion set unless a stop is made at a programmed intermediate point. The requirement imposed on the control system for control of the positioning system is to concatenate successive motion sets in such a way that a smooth transition from one motion set to the next occurs with respect to the velocity as well as position. Within a region determined by means of a concatenation criterion, the control system should replace the two motion sets with a concatenation contour so that the transitional motion is continuous in both orientation and velocity of orientation. For the mathematical description of the orientation, use is often made of roll, pitch and yaw angles. (See Paul, R. B., "Robot Manipulators: Mathematics, Programming and Control", and particularly chapter 2, p. 45 et seq. [The MIT Press, Cambridge, Mass., and London, England, 1981].)

In his article, "Planning and Execution of Straight-Line Manipulator Trajectories", published in "Robot Motion" (The MIT Press, 1982), Russell H. Taylor describes an orientation interpolation with continuous transition in which the orientation guidance of the tool in the individual sets is performed through a rotating vector for all tool axes and the concatenating motion is generated through superposition of successive individual sets. In the orientation guidance in the individual sets, advantage is taken of the fact that every three-dimensional rotation can be represented geometrically by a specific rotating vector and an angle of rotation.

Although continuous orientation guidance is obtained by the method described, individual-set interpolation has considerable shortcomings. Depending on the variation of the roll-pitch-yaw angle (hereinafter called RPY angle) C, the tool axes will cut out large or small circles on the unit sphere about the tool tip. In extreme cases, this may give rise to a kind of wobbling motion that is very undesirable, and since there is only one rotating vector for all tool axes, it is pointless to apply this method to kinematics with fewer than six degrees of freedom.

The present invention is directed to the problem of developing a continuous motion-optimal method for the transition between two motion sets or trajectory segments. The present invention is also directed to the problem of developing such a method which is also meaningfully applicable to kinematics with fewer than six degrees of freedom and which lends itself to being combined with an orientation guidance in the individual sets that is understandable by the user. An example of such an orientation guidance is the orientation guidance through a slewing motion of the longitudinal axis of the tool (the $X_{WZ}$ axis) and a superimposed rotation described by R. P. Paul in "Robot Manipulators: Mathematics, Programming and Control".

SUMMARY OF THE INVENTION

This present invention solves this problem by positioning the body to be positioned by the control system, which controls the positioning system, with respect to any desired reference coordinate system on the basis of specifiable motion sets, where the spatial position of the body is given by its location and its orientation. Then, an imaginary axis (the $X_W$ axis) is firmly connected with the body, where the imaginary axis passes through the body's location and can be selected at will. As the body moves, its orientation traces a space curve. On that space curve there is specified in every first motion set a first concatenation orientation, and in the second motion set which follows a second concatenation orientation. The plane which passes through the $X_{W1}$ axis of the first concatenation orientation and the $X_{W2}$ axis of the second concatenation orientation forms the $X_H$-$Y_H$ principal plane of an auxiliary Cartesian coordinate system. The origin of this auxiliary Cartesian coordinate system is the location of the body, and also the point of intersection of the $X_{W1}$ and $X_{W2}$ axes, where the $X_{W1}$ axis is coincident with the $X_H$ axis of the auxiliary coordinate system. Between the first and second concatenation orientations, the orientation relative to the auxiliary coordinate system is interpolated by means of the roll, pitch and yaw angles. To this end, the roll, pitch and yaw angles relative to the auxiliary coordinate system are first determined for the first and second concatenation orientations. The vectorial orientation velocities are determined on the concatenation orientations, converted to the auxiliary coordinate system, and transformed into roll, pitch and yaw angular velocities. Scalar path-time functions are then specified from the roll, pitch and yaw angles and the angular velocities, so that a constant velocity is assured for the transition from the first to the second motion set.

A substantial advantage of the present invention is that because of the specific selection of the auxiliary coordinate system the RPY angles B1, B2 and A1 have the value $B1=B2=A1=U$ in the concatenation orientations. The cost of computing the remaining RPY angles and the RPY angular velocities is thus considerably reduced. Moreover, the singular configuration of the RPY angles at $B=\pm 90°$, which in this range gives rise to wobbling motions, is avoided.

The invention relates to all positioning systems which set the spatial position of a body. The method can be used in any spatial motion-control system, for example, in a machine-tool control system or any other system that is movable in space, even though the exemplary embodiment which follows relates to an industrial robot as positioning system and to a robot-guided tool as body to be positioned.

BRIEF DESCRIPTION OF THE DRAWINGS

FIGS. 6 to 8 are velocity profiles.

DETAILED DESCRIPTION

Before the method of the present invention is described in an embodiment of robot control, the fundamental mathematical relations will first be explained. The task of trajectory control of the robot is to move a tool affixed to the hand of the robot from an initial position on a defined Cartesian path to a final position. The initial and final positions include both a position component and an orientation component and are based on a base system which can be specified by the user.

Figure 1:
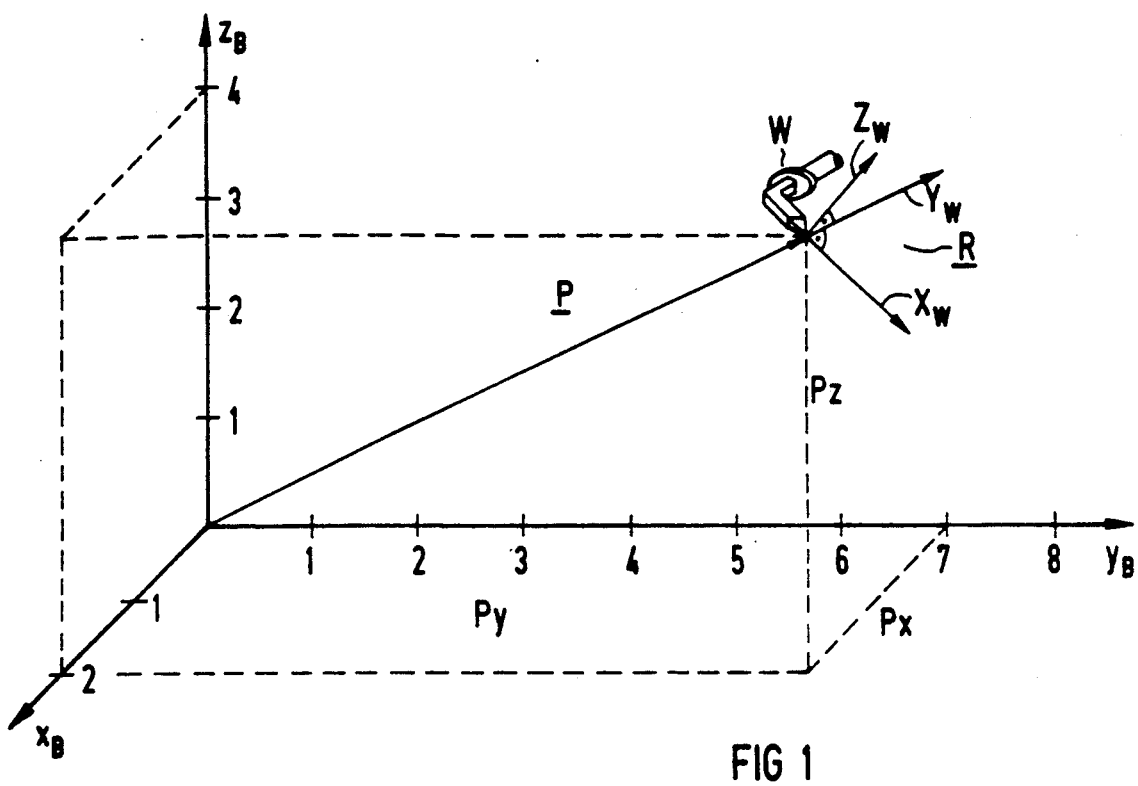
FIG. 1 shows the tool W of a robot in relation to a Cartesian coordinate system.

FIG. 1 shows a Cartesian base coordinate system with the coordinates $X_B$, $Y_B$ and $Z_B$. In this coordinate system, only the robot tool W is shown of the robot. (The term "robot tool" should be interpreted broadly. It includes all parts which can be affixed to the hand of the robot, for example, grippers, sensors, etc.) The location of the tip of the robot tool is described by the vector P. The orientation R of the tool W is described by the tool coordinate system $X_W$, $Y_W$ and $Z_W$, whose origin is coincident with the tip of the tool. For the definition of appropriate motion specifications, the location P and the orientation R must first be given in mathematically single-valued form. Through the position of the tool coordinate system $X_W$, $Y_W$ and $Z_W$ relative to the base system $X_B$, $Y_B$ and $Z_B$, the tool position can be described mathematically by means of homogeneous matrices:

$$F = \begin{pmatrix} n_x o_x a_x p_x \\ n_y o_y a_y p_y \\ n_z o_z a_z p_z \\ 0\ 0\ 0\ 1 \end{pmatrix} = \begin{pmatrix} R & P \\ \hline 0001 & \end{pmatrix} \quad \text{EQUATION}$$

where $$R = \begin{pmatrix} n_x o_x a_x \\ n_y o_y a_y \\ n_z o_z a_z \end{pmatrix} \quad P = \begin{pmatrix} p_x \\ p_y \\ p_z \end{pmatrix} \quad \text{EQUATION 2}$$

The column vector $$P = \begin{pmatrix} p_x \\ p_y \\ p_z \end{pmatrix} \quad \text{EQUATION 3}$$

describes the origin of the tool system relative to the base system. The matrix $$R = \begin{pmatrix} n_x o_x a_x \\ n_y o_y a_y \\ n_z o_z a_z \end{pmatrix} \quad \text{EQUATION 4}$$

describes the orientation of the tool in the base system; the column vector $$n = \begin{pmatrix} n_x \\ n_y \\ n_z \end{pmatrix} \quad \text{EQUATION 5}$$

identifies the position of the $X_W$ axis in the base system; the column vector $$o = \begin{pmatrix} o_x \\ o_y \\ o_z \end{pmatrix} \quad \text{EQUATION 6}$$

identifies the position of the $Y_W$ axis in the base system; and the column vector $$a = \begin{pmatrix} a_x \\ a_y \\ z_z \end{pmatrix} \quad \text{EQUATION 7}$$

identifies the position of the $Z_W$ axis in the base system.

Figure 2:
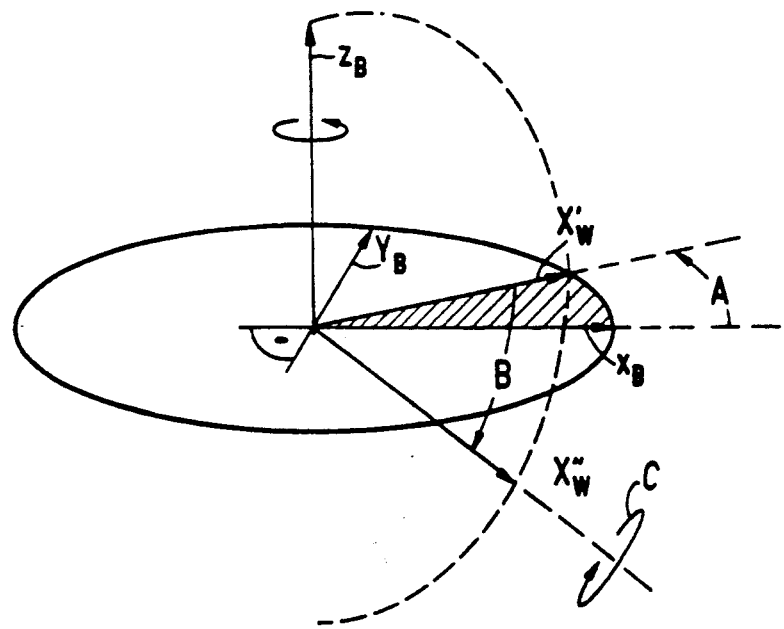
FIG. 2 defines the roll, pitch and yaw angles.

Alternatively, the orientation R of the tool W can be described by means of RPY or Euler angles. Since the RPY representation is relevant to the invention, it will now be briefly explained:

In FIG. 2, the roll, pitch and yaw angles A, B and C are represented. The $X_W$ axis of the tool (not shown) is projected as $X_W'$ axis onto the $X_B$, $Y_B$ plane of the base system. The RPY angle A is the angle between the $X_B$ axis and the $X_W'$ axis. The angle B represents the lift angle of the $X_W''$ axis above the $X_B$, $Y_B$ plane of the base system, and the angle C relates to a rotation about the $X_W''$ axis with which the $Y_B$ and $Z_B$ axes can be brought into coincidence with the $Y_W$ and $Z_W$ axes (not shown) after execution of the rotations about A and B.

The mathematical relationship between the orientation matrix R and the RPY angles A, B and C is given by:

$$R = \text{Rot}(z, A) \cdot \text{Rot}(y, B) \cdot \text{Rot}(x, C) \quad \text{EQUATION 8}$$

$$R = \begin{pmatrix} \cos A & -\sin A & 0 \\ \sin A & \cos A & 0 \\ 0 & 0 & 1 \end{pmatrix} \cdot \begin{pmatrix} \cos B & 0 & \sin B \\ 0 & 1 & 0 \\ -\sin B & 0 & \cos B \end{pmatrix} \cdot \begin{pmatrix} 1 & 0 & 0 \\ 0 & \cos C & -\sin C \\ 0 & \sin C & \cos C \end{pmatrix} \quad \text{EQUATION 9}$$

Thus, the terminology required for representation of the concatenating method is at hand. Although it lends itself to fairly universal use (for example, for circular sets with trajectory-related orientation guidance), the method will now be explained in terms of an actual motion task, i.e. the concatenation of two linear sets.

To this end, the interpolation of linear individual sets will first be outlined, with the orientation guidance based on a slewing motion of the longitudinal axis of the tool with superimposed rotary motion. From the initial and final positions F and F', respectively, $$F = \begin{pmatrix} R & P \\ \hline 0001 & \end{pmatrix} = \begin{pmatrix} n o a\ p_x \\ p_y \\ p_z \\ \hline 001\ 1 \end{pmatrix} \quad \text{EQUATION 10}$$

-continued $$F' = \begin{pmatrix} n'o'a'p_x' \\ p_y' \\ p_z' \\ \hline 0\ 0\ 0\ 1 \end{pmatrix}$$

EQUATION 11 the distances are first calculated, $$d_x = p_x' - p_x$$
$$d_y = p_y' - p_y$$
$$d_z = p_z' - p_z'$$

EQUATION 12

$$S = \sqrt{(d_x^2 + d_y^2 + d_z^2)}$$

EQUATION 13 and the change in orientation is written as product, $$R^{-1}R' = \begin{pmatrix} n''_x o''_x a''_x \\ n''_y o''_y a''_y \\ n''_z o''_z a''_z \end{pmatrix} = Rot(k, \theta) \cdot Rot(x, \phi)$$

EQUATION 14 where $$k = \frac{1}{\sqrt{n''_y{}^2 + n''_z{}^2}} \cdot \begin{pmatrix} 0 \\ -n''_z \\ n''_y \end{pmatrix}$$

EQUATION 15

$$\theta = \arctan2(n \times n', n \cdot n')$$
$$= \arctan2(\sqrt{n''_y{}^2 + n''_z{}^2}, n''_x)$$

EQUATION 16 from which $\phi$ is implicit through EQUATION 14. Then, there are developed for s, $\Theta$ and $\phi$ path-time functions $s(\tau)$, $\Theta(\tau)$ and $\phi(\tau)$, where
$s(0) = \Theta(0) = \phi(0) = 0$
$s(\tau) = s$
$\Theta(\tau) = \Theta$
$\phi(\tau) = \tau$
i.e. trapezoidal profiles with an acceleration, constant-velocity and deceleration phase. An interpolation is performed in accordance with the specification $$F(\tau) = \begin{pmatrix} R \cdot Rot(k, \theta(\tau)) \cdot & p_x + \frac{d_x}{s} s(\tau) \\ Rot(x, \phi(\tau)) & p_y + \frac{d_y}{s} s(\tau) \\ & p_z + \frac{d_z}{s} s(\tau) \\ \hline 0 \quad\quad 0\ 0 & 1 \end{pmatrix}$$

EQUATION 17

The inventive orientation concatenation will now be presented for two linear sets interpolated in this manner.

Figure 3:
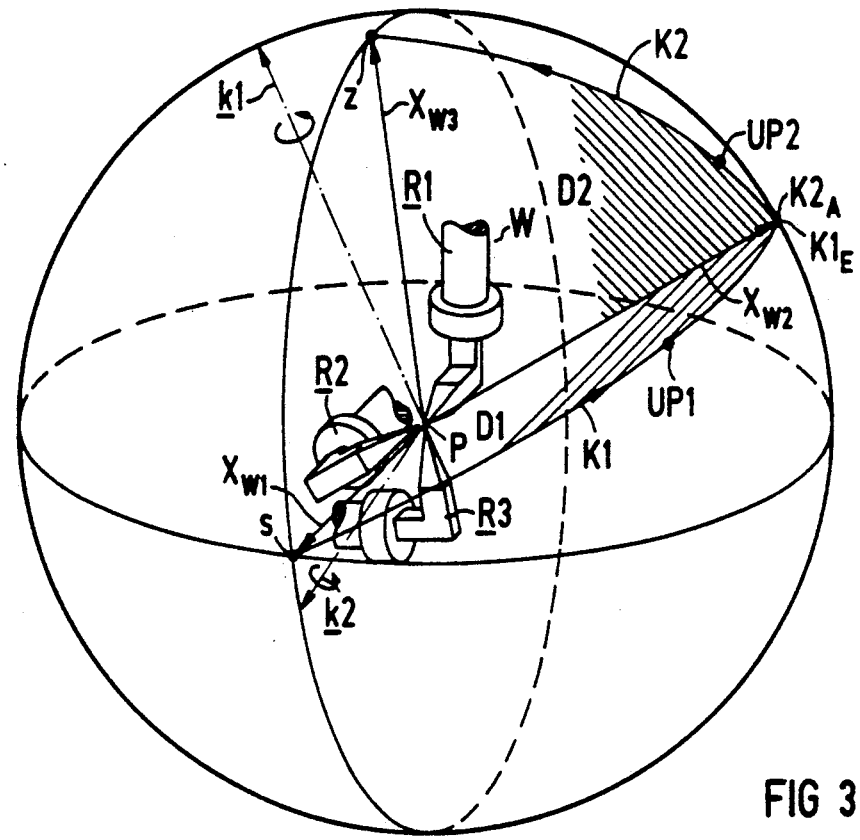
FIG. 3 illustrates an orienting motion of the robot's tool during two successive motion sets.

FIG. 3 shows the tool W of the robot in three different orientations, i.e in the orientation R1 at the starting point, in the orientation R2 at the programmed intermediate point, and in the orientation R3 at the end point. Shown about the point P of the tool W is the unit sphere, which moves along with the location of the point of the tool. However, the location-changing displacement of the tool point P here is not relevant since the observer of the orienting motion undergoes the same displacement. Of the tool coordinate system, only the axes $X_{W1}$, $X_{W2}$ and $X_{W3}$ which correspond to the particular tool orientations R1, R2 and R3 are shown. Without concatenation, two linear sets would have to be traversed; during the execution of the first motion set the tool orientation R1 would pass into the tool orientation R2 and at the end of the second motion set the tool orientation R3 would have to be attained.

The orienting motion of the tool W may be easier to understand if in the tip of the tool a laser is visualized whose beam forms the $X_W$ axis of the tool W. The laser beam would then project onto the unit sphere a light spot corresponding to the tip of the $X_W$ unit vector. During the orienting motion of the tool W from tool orientation R1 to tool orientation R2, the light point traces from the starting point S a space curve K1 to the end point $K1_E$ of the first motion set. The end point $K1_E$ of the space curve K1 is also the starting point $K2_A$ of the space curve K2. At the end of the second motion set, the tool should be in orientation R3, the $X_{W3}$ axis (the laser light spot) then having reached the destination point Z at the end of the space curve K2.

The two planes of rotation D1 and D2 which make an angle with each other are intended to illustrate the fact that as a rule the orienting velocity on the first space curve K1 is different from the orienting velocity on the second space curve K2.

Figure 4:
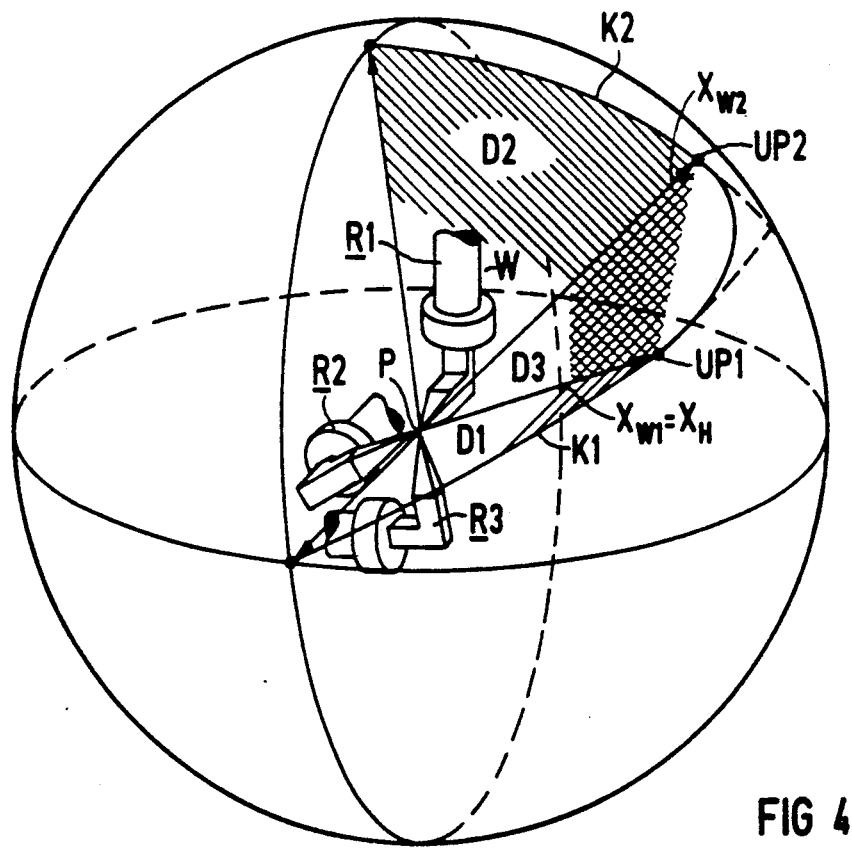
FIG. 4 illustrates an orienting motion during two successive motion sets with a concatenation range.

For a smooth velocity transition in the orienting motion of the tool from position R1 to position R2 and finally to position R3, concatenation orientations UP1 and UP2 are therefore specified on the space curves K1 and K2, respectively, on the basis of a concatenation criterion (for example, the distance from the programmed intermediate point). Between these two concatenation orientations UP1 and UP2, a concatenating trajectory is now generated in such a way that a smooth transition between the tool orientations R1, R2 and R3 is assured. This will now be explained in greater detail with reference to FIG. 4.

In FIG. 4, the tool W is again shown in the three tool orientations R1, R2 and R3 with the unit sphere about the tip of the tool. Between the familiar concatenation orientations UP1 and UP2 there extends, in addition to the planes of rotation D1 and D2 known from FIG. 3, a plane of rotation D3.

In the concatenation range between the concatenation orientations UP1 and UP2, the orienting motion of the tool W is now interpolated by means of the roll, pitch and yaw (RPY) angles, which are defined relative to a specific auxiliary coordinate system. The latter is specified so that the $X_{W1}$ axis (the laser beam) of the tool coordinate system on the concatenation orientation UP1 coincides with the $X_H$ axis of the auxiliary coordinate system. Through the $X_{W1}$ axis (i.e., the $X_H$ axis) of the tool orientation R at the concatenation point UP1 and the $X_{W2}$ axis of the tool orientation on the concatenation orientation UP2 the plane D3, which forms the $X_H$-$Y_H$ plane of the auxiliary coordinate system, is extended. The $Z_H$ axis of the auxiliary coordinate system is normal to the plane D3. (For the sake of clarity, the $Y_H$ and $Z_H$ axes are not shown.) The origin of the auxiliary coordinate system $X_H$, $Y_H$ and $Z_H$ is in the tip of the tool W.

The auxiliary coordinate system $X_H$, $Y_H$ and $Z_H$ is thus specified so that the RPY angle B (the lift angle) has the value 0 in the concatenation orientations UP1 and UP2.

For the concatenation orientations UP1 and UP2, only the remaining RPY angles A and C are determined and the vectorial orienting velocities converted to angular velocities A', B' and C'. With the aid of these boundary values, scalar path-time functions $A(\tau)$, $B(\tau)$ and $C(\tau)$ are specified in such a way that a constant velocity is assured.

Figure 5:
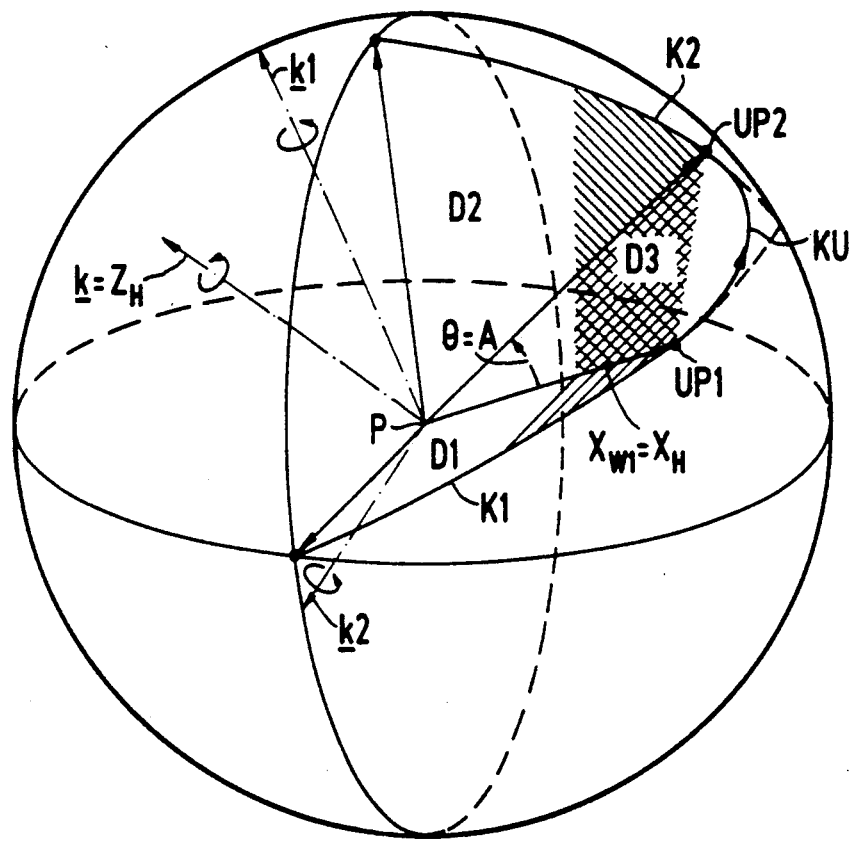
FIG. 5 shows the auxiliary coordinate system for an orienting motion in the concatenation range.

The principal steps of the method will now be described mathematically in greater detail with reference to FIG. 5. That figure shows the familiar unit sphere, whose center is coincident with the tip of the robot's tool, here not shown for the sake of clarity. Assigned to the planes of rotation D1, D2 and D3 are the plane vectors k1, k2 and k, respectively. It is apparent that the plane vector k coincides with the $Z_H$ axis of the auxiliary coordinate system $X_H$, $Y_H$ and $Z_H$.

1. First the tool orientations $R_{UP1}$ and $R_{UP2}$ and the orientation velocity $W_{UP1}$ and $W_{UP2}$ at the concatenation points UP1 and UP2, respectively, are calculated according to the following equations:

$$R_{UP1} = R_1 \cdot Rot(k_1, \theta_1(\tau_{UP1})) \cdot Rot(x, \phi_1(\tau_{UP1})) \quad \text{EQUATION 18}$$

$$R_{UP2} = R_2 \cdot Rot(k_2, \theta_2(\tau_{UP2})) \cdot Rot(x, \phi_2(\tau_{UP2})) \quad \text{EQUATION 19}$$

$$W_{UP1} = R_1 \cdot k_1 \cdot \theta_1'(\tau_{UP1}) + R_{UP1}\begin{pmatrix}1\\0\\0\end{pmatrix}\phi_1'(\tau_{UP1}) \quad \text{EQUATION 20}$$

$$W_{UP2} = R_2 \cdot k_2 \cdot \theta_2'(\tau_{UP2}) + R_{UP2}\begin{pmatrix}1\\0\\0\end{pmatrix}\phi_2'(\tau_{UP2}) \quad \text{EQUATION 21}$$

2. In the auxiliary coordinate system, the orientation difference $$R_{UP1}^{-1} \cdot R_{UP2} \quad \text{EQUATION 22}$$

is determined, $$R_{UP1}^{-1} \cdot R_{UP2} = \begin{pmatrix} n_x'' & o_x'' & a_x'' \\ n_y'' & o_y'' & a_y'' \\ n_z'' & o_z'' & a_z'' \end{pmatrix} = Rot(k, \theta) \cdot Rot(x, \phi) \quad \text{EQUATION 23}$$

with k, $\Theta$ and $\phi$ resulting from EQUATIONS 15, 16 and 14, respectively. The orientation $R_H$ in the auxiliary coordinate system is described by $$R_H = (n_H, o_H, a_H) \quad \text{EQUATION 24}$$

$n_H$ being the first column vector of $R_{UP1}$, $$n_H = x_{W1} \quad \text{EQUATION 25}$$

$a_H$ resulting from the multiplication of $R_{UP1}$ by the vector k of the plane of rotation D3, $$a_H = R_{UP1} \cdot k \quad \text{EQUATION 26}$$

and the vector $o_H$ being normal to $a_H$ and $n_H$, $$o_H = a_H \times n_H \quad \text{EQUATION 27}$$

3. In the third step, the RPY angles A1, B1 and C1, and A2, B2 and C2, are determined, the definition of the auxiliary coordinate system resulting directly in:

$$A1 = 0 \quad B1 = B2 = 0 \quad A2 = 0$$
$$C1 = -\psi \quad C2 = \phi - \psi \quad \text{EQUATION 28}$$

where $$\psi = \arctan2 \cdot (n_z'', n_y'') \quad \text{EQUATION 29}$$

4. The RPY angular velocity A1', B1' and C1', and A2', B2' and C2', result from the following equations:

$$\begin{pmatrix}C1'\\B1'\\A1'\end{pmatrix} = R_H^{-1} \cdot W_{UP1} \quad \text{EQUATION 30}$$

$$\begin{pmatrix}C2'\\B2'\\A2'\end{pmatrix} = Rot(\tau, \theta)^{-1} \cdot R_H^{-1} \cdot W_{UP2} \quad \text{EQUATION 31}$$

5. The path-time functions $A(\tau)$, $B(\tau)$ and $C(\tau)$ are specified with the following boundary conditions:

$$A(0) = A1 \quad A'(0) = A1' \quad \text{EQUATION 32}$$
$$A(T) = A2 \quad A'(T) = A2'$$

The concatenation time T being one-half of the time required to traverse an individual-set segment.

As shown in FIGS. 6, 7 and 8, a kneelike velocity profile with two time segments of a duration of T/2, for example, may be specified for each RPY angle A, B and C.

The acceleration $a_A$ and $A'_A$, $a_B$ and $a'_B$, and $a_C$ and $a'_C$ assigned to the respective intervals |1| and |2| can be calculated as in the case of the interpolation of the axes. For example, for the RPY angle A the acceleration $a_A$ and $a'_A$ are determined by the following equations:

$$a_A = \frac{4 \cdot (A2 - A1) - (A2' + 3A1')T}{T^2} \quad \text{EQUATION 33}$$

$$a'_A = \frac{-4(A2 - A1) + (A1' + 3A2')T}{T^2} \quad \text{EQUATION 34}$$

The equations for $a_B$ and $a'_B$, and $a_C$ and $a'_C$, are analogous.

6. In the cyclic analysis, the angles $A(\tau)$, $B(\tau)$ and $C(\tau)$ are first formed in accordance with the velocity profiles. The matrix $R(\tau)$ results as follows:

$$R(\tau) = R_H \cdot Rot(z, A(\tau)) \cdot Rot(y, B(\tau)) \cdot Rot(x, C(\tau)) \quad \text{EQUATION 35}$$

What is claimed is:

1. A method for controlling a positioning system by means of a control system comprising the steps of:
   a) positioning a body (W), which is desired to be positioned, in relation to any desired reference coordinate system by the control system, wherein said positioning is performed on a basis of a plurality of specifiable motion sets, and wherein a spatial position of the body (W) is given by a location (P) and an orientation (R) of the body;
   b) coupling an imaginary axis ($X_W$) with said body (W), wherein said imaginary axis ($X_W$) passes through the location (P) and can be selected at will;
   c) tracing a first space curve (k1) and a second space curve (k2) by the body orientation (R) when the body (W) moves, whereby a tip of a polar vector ($X_W$) sweeps along said first and second space curves (k1, k2);

d) specifying a first concatenation orientation (UP1) on the first space curve (k1) of a first motion set;

e) specifying a second concatenation orientation (UP2) on the second space curve (k2) of a second motion set, wherein said second motion set follows said first motion set;

f) forming a $X_H$-$Y_H$ principal plane of an auxiliary Cartesian coordinate system ($X_H$, $Y_H$, $Z_H$) by a plane which passes through an $X_{W1}$ axis of the body orientation (R(UP1)) in the first concatenation orientation (UP1) and passes through an $X_{W2}$ axis of the body orientation (R(UP2)) in the second concatenation orientation (UP2), wherein an origin of said auxiliary Cartesian coordinate system is the location (P) of the body, wherein the $X_{W1}$ axis is coincident with the $X_H$ axis of the auxiliary Cartesian coordinate system;

g) determining a first and a second roll angle (A1, A2), a first and a second pitch angle (B1, B2), and a first and second yaw angle (C1, C2) for the first and second concatenation orientations (UP1, UP2) relative to the auxiliary Cartesian coordinate system;

h) interpolating an orientation relative to the auxiliary Cartesian coordinate system between the first and second concatenation orientation (UP1, UP2), whereby said interpolating is performed using said first and second roll angles (A1, A2), said first and second pitch angles (B1, B2) and said first and second yaw angles (C1, C2);

i) determining a first and second vectorial orientation velocities on the concatenation orientations (UP1, UP2);

j) transforming the first and second vectorial orientation velocities to the auxiliary Cartesian coordinate system resulting in a first and second prime vectorial orientation velocities;

k) transforming the first and second prime vectorial orientation velocities into a first and a second roll angular velocity (A1', A2'), a first and a second pitch angular velocity (B1', B2'), and a first and a second yaw angular velocity (C1', C2'); and l) specifying a first, second and third scalar path-time function from said first and second roll, pitch and yaw angles (A1, B1, C1, A2, B2, C2) and said first and second roll, pitch and yaw angular velocities (A1', B1', C1', A2', B2', C2');

m) moving said body according to the first, second and third scalar path-time functions, whereby a continuous velocity is assured for a transition from the first motion set to the second motion set.

* * * * *